United States Patent
Kamon et al.

(10) Patent No.: US 7,272,801 B1
(45) Date of Patent: Sep. 18, 2007

(54) SYSTEM AND METHOD FOR PROCESS-FLEXIBLE MEMS DESIGN AND SIMULATION

(75) Inventors: Mattan Kamon, Arlington, MA (US); Gunar Lorenz, St. Remy les Chevreuse (FR); Stephen R. Breit, Wayland, MA (US)

(73) Assignee: Coventor, Inc., Cary, NC (US)

( * ) Notice: Subject to any disclaimer, the term of this patent is extended or adjusted under 35 U.S.C. 154(b) by 419 days.

(21) Appl. No.: 10/799,391

(22) Filed: Mar. 12, 2004

Related U.S. Application Data (60) Provisional application No. 60/454,982, filed on Mar. 13, 2003.

(51) Int. Cl.
*G06F 17/50* (2006.01)
(52) U.S. Cl. .............................. 716/1; 716/4
(58) Field of Classification Search ............ 716/4, 716/1, 11
See application file for complete search history.

(56) References Cited

U.S. PATENT DOCUMENTS

| | | | | |
|---|---|---|---|---|
| 6,116,766 A | * | 9/2000 | Maseeh et al. | 700/97 |
| 6,157,900 A | * | 12/2000 | Maseeh | 703/2 |
| 6,542,829 B1 | * | 4/2003 | Gupta | 702/33 |
| 6,691,068 B1 | * | 2/2004 | Freed et al. | 702/187 |
| 7,168,041 B1 | * | 1/2007 | Durrill et al. | 715/700 |
| 7,199,809 B1 | * | 4/2007 | Lacy et al. | 715/700 |
| 2004/0236524 A1 | * | 11/2004 | Mundt | 702/56 |
| 2005/0125750 A1 | * | 6/2005 | Lorenz | 716/4 |
| 2005/0278670 A1 | * | 12/2005 | Brooks et al. | 716/5 |

\* cited by examiner

*Primary Examiner*—Paul Dinh
*Assistant Examiner*—Suchin Parihar
(74) *Attorney, Agent, or Firm*—Lahive & Cockfield, LLP (57) ABSTRACT

A system-level design and simulation environment utilizing a process specification tool that is programmatically integrated with the system level design and simulation environment thereby enabling the process-flexible design and simulation of Micro Electro-Mechanical Systems (MEMS) devices and other micro-fabricated devices is disclosed. The process specification tool is a software tool for specifying the details of the fabrication process and enables the separation of the process data from the system-level design and simulation environment. The process specification tool retrieves the process data, which may include both the process specification and material properties data. The separation of this process data from the system-level design and simulation environment allows the system-level model to have process-related parameters whose specification is not fixed, but rather is tied by reference to the process data. The tying of components to the process data allows the system-level environment to extract multiple process parameters for each component model instead of requiring duplicate entry of these parameters in each component model, a time-consuming and error prone process. Modifications of the process data are programmatically communicated to the system-level environment. The dynamic response to changes in the process data allows alternative simulations to be run more effectively and quickly than in traditional IC design environments.

25 Claims, 7 Drawing Sheets

| File | Edit | View | Help | | | ProcessEditor: u:\Design_Files\BeamDesign\Devices\beam.proc | | | | |
|---|---|---|---|---|---|---|---|---|---|---|

| Step | Action | Type | Layer Name | Material | Thickness | Color | | Mask Name/ Polarity | Depth | Offset |
|---|---|---|---|---|---|---|---|---|---|---|
| 0 | Base | | Substrate | SCILICON | 10.0 | cyan | | GND | | |
| 1 | Deposit | Stacked | Nitride | SIN | 0.2 | ■ | blue | | | |
| 2 | Deposit | Stacked | Sacrifice | BPSG | 2.0 | □ | yellow | | | |
| 3 | Etch | Front, Last Layer | | | | □ | yellow | anchor − | 2.0 | 0.0 |
| 4 | Deposit | Conformal | poly | POLYSILICON | 0.5 | ■ | red | | | |
| 5 | Etch | Front, Last Layer | | | | ■ | red | beam + | 0.5 | 0.0 |
| 6 | Deposit | Stacked | metal1 | ALUMINUM(FILM) | 1.0 | □ | green | | | |
| 7 | Etch | Front, Last Layer | | | | □ | cyan | met1 + | 1.0 | 0.0 |
| 8 | Deposit | Planar | metal2 | GOLD | 1.0 | ■ | red | | | |
| 9 | Etch | Front, Last Layer | | | | □ | white | met2 + | 1.0 | 0.0 |
| 10 | Sacrifice | | | BPSG | | | | | | |

SYSTEM AND METHOD FOR PROCESS-FLEXIBLE MEMS DESIGN AND SIMULATION

RELATED APPLICATION

This application claims priority to a U.S. Provisional Application entitled "A System and Method for Process Flexible MEMS Design and Simulation", Ser. No. 60/454,982, filed on Mar. 13, 2003.

FIELD OF THE INVENTION

The present invention relates generally to Computer Aided Design (CAD) and more particularly to a process specification tool that communicates with a system-level design and simulation environment, thus enabling the process-flexible design of Micro Electro-Mechanical Systems (MEMS) devices in a CAD system.

BACKGROUND OF THE INVENTION

Computer Aided Design (CAD) systems are used to design and simulate virtual models of electrical, electronic or mechanical devices prior to producing actual physical devices. CAD systems are interactive software tools that run on a digital computer with a graphical display device. In particular, micro-fabricated devices such as electronic integrated circuits (ICs) and Micro Electro-Mechanical Systems (MEMS) can be designed and simulated using CAD systems prior to beginning the costly and time-consuming process of fabricating actual physical devices. The micro-fabrication process (or "process") for MEMS and IC devices involves depositing multiple layers of material on a silicon wafer and optionally etching each layer with a patterned mask to define the device shape. The functionality of both ICs and MEMS devices depends strongly on this process.

MEMS are micro or nano-scale devices typically fabricated in a similar fashion as integrated circuits (ICs) to exploit the miniaturization, integration, and batch processing attainable with semiconductor manufacturing processes. Unlike ICs which consist solely of electrical components, MEMS devices combine components from multiple physical domains and can contain, for instance, electrical, mechanical, and fluidic components. MEMS devices include, for instance, micro-electromechanical sensors and actuators such as gyroscopes, accelerometers, and pressure sensors, micro-fluidic devices such as ink jet heads, Radio-Frequency (RF) devices such as switches, resonators and passives, and optical devices such as micro-mirrors.

The behavior of both MEMS and IC devices can be modeled at the system level, that is, as an interconnected network of simpler components. Each component has an underlying mathematical description, or behavioral model, which is referred to herein as a component model. Typically, these component models are parameterized, i.e. they take as input a few parameters such as width and height, so that the same mathematical model can be used for different versions of the same type of component. For example, a single component model may be used to generate models having different dimensions. A system-level simulator numerically computes, or simulates, the collective behavior of the network of component models.

Two commonly used methods of describing a system-level simulation are circuit simulation and signal-flow simulation. A system-level design is captured graphically in a circuit schematic or in a signal-flow diagram, and then its behavior is simulated by, respectively, a circuit simulator or a signal-flow simulator. Traditionally, circuit simulation has been used for electronic circuit design while signal-flow simulation has been used for control system and signal processing design. Currently, both types of system-level simulation are used to simulate not only ICs, but multi-physics devices such as MEMS.

Since MEMS devices are fabricated in a similar fashion as ICs and can also be simulated by system-level methods such as circuit simulation, CAD systems for IC design can be applied to MEMS design, at least in principle. In particular, IC schematic capture tools and circuit simulators can be applied to MEMS design when supplied with a library of MEMS component models.

Unfortunately, while MEMS and IC design share aspects related to manufacturing, they differ in the impact manufacturing has on their design flows. In particular, the micro-fabrication processes for IC devices are standardized. IC components are fixed within a fabrication process, while MEMS components are not. For instance, a transistor (an IC component) is created out of specific layers deposited on the silicon substrate during the fabrication process and these layers cannot be changed by the IC designer, but a mechanical beam component that is part of a MEMS design can be placed on any layer and that layer is a design choice. Conventional IC design tools do not offer the flexibility to change the location of a component within the various layers deposited during the fabrication process. Thus the details of the chosen fabrication process of an IC are fixed from the beginning and do not change from one design iteration to the next. In comparison, the fabrication processes of MEMS devices are not standardized. It is often necessary to tailor the fabrication process to a particular MEMS device in order to achieve the design goals for the device. Thus the fabrication process is an important "free parameter" in MEMS designs that will likely need to be changed as the design of a MEMS device progresses. The flexibility to change the description of the fabrication process is missing from IC design environments.

An additional problem with the use of conventional IC/MEMS design environments is that the mathematical models of electrical IC components can not be parameterized in terms of the process parameters since IC processes do not vary as part of the design. In MEMS design, the parameters of the process description can be varied as part of the design and the mathematical models must be parameterized with respect to the process parameters. The user must specify all of these process parameters in an IC schematic editor. Since there may be hundreds of such parameters, specifying this data and changing it throughout the design process is time-consuming and subject to error.

SUMMARY OF THE INVENTION

The illustrative embodiment of the present invention provides a process specification tool that is programmatically integrated with a system-level design and simulation environment thereby enabling the process-flexible design and simulation of Micro Electro-Mechanical Systems (MEMS) devices and other micro-fabricated devices. The process specification tool is a software tool for specifying the details of the fabrication process and enables the separation of the process specification data from the system-level design and simulation environment. The process specification tool retrieves the process data, which may include both a process specification and material properties. The separation of this process data from the system-level design and simulation environment allows the system-level model to have process-related parameters whose specification is not fixed, but rather is tied by reference to the process data. The tying of components to the process data allows the system-level environment to extract multiple process parameters for each component model instead of requiring duplicate entry of these parameters by the user in each component model, a time-consuming and error prone process. Modifications of the process data are programmatically communicated to the system-level environment. The dynamic response to changes in the process data allows alternative simulations to be run more effectively and quickly than in traditional IC design environments.

In one embodiment, a system for designing a device with multiple components which is to be fabricated through a process includes a system-level design and simulation environment for receiving information about the components. The system-level design and simulation environment prepares a system-level schematic of the device that connects the components. The system-level design and simulation environment also runs a circuit simulation of the device based on the schematic. The system further includes an external location for holding process data. The process data includes a process specification and a collection of material property data regarding device components. The system additionally includes a process specification tool capable of retrieving the process data and communicating with the system-level design and simulation environment to provide the process data to the system-level design and simulation environment.

In another embodiment, in an electronic device holding a device system-level design and simulation environment which is interfaced with at least one schematic that includes multiple components, each component including a component model which is a mathematical description of component behavior, the electronic device also being interfaced with an external location holding process data, a method includes the step of providing a process specification tool capable of retrieving the process data. The process specification tool also is capable of communicating the process data to the system-level design and simulation environment. The method also integrates the process specification tool with the system level design and simulation environment. The integration programmatically alters the schematic based on changes in the process data.

DETAILED DESCRIPTION

The illustrative embodiment of the present invention allows fabrication process details from the manufacture of MEMS devices and other devices to be separated from both the component model library and the system-level design and simulation environment. The system-level design and simulation environment includes a schematic editor and a circuit simulator. The process data is managed by a process specification tool that is tightly integrated with the schematic editor and circuit simulator. The process specification tool allows the component models to dynamically reference the process data. The details of the process specification are managed so that during the use of the schematic editor and circuit simulator, only the layer(s) on which a component is to be placed need to be specified. The use of the process specification tool creates a flexible design and simulation environment in which multiple process variations and device designs can be explored and compared prior to the expensive production of the actual physical devices.

The illustrative embodiment of the present invention is described herein primarily in connection with circuit simulation, but it is also applicable to signal-flow simulation and other types of simulation performed in a CAD environment. A schematic of a MEMS device is composed in a schematic editor by selecting, placing and connecting symbols. Each symbol represents a component model. Procedurally, the user selects the desired component models from the available component model libraries, configures the parameters of the component models, and interconnects their ports to create a schematic of the entire device. The procedure is analogous to integrated circuit capture, where symbols representing electronic components such as transistors, resistors, inductors and capacitors are connected to create the desired circuit behavior. The symbols that represent the electronic components have ports, or pins, that can be connected by wires to pins on other components. Each pin has a voltage and transfers current into or out of the component. In the case of MEMS schematic capture, the components represent entities from other physical domains, such as masses, plates, magnets, electrostatic comb structures and electrodes. The symbol ports of MEMS component models represent inputs for electrical, mechanical or magnetic sources, or can be input or output control pins for mechanical degrees of freedom (translational and rotational motions). For the mechanical components, force rather than current is transferred between pin connections.

MEMS component libraries include underlying behavioral models that describe mathematically how the individual components behave when subjected to electrical or mechanical stimuli or stimuli from other domains. A component itself may also be a subsystem comprised of other components, such as a mirror which might be composed of a plate with beams and electrodes.

The illustrative embodiment of the present invention uses a process specification tool to access and retrieve process data from an external location for the purpose of performing system-level design and simulation of MEMS devices. The process data may include both the fabrication process specification which defines how to construct a MEMS device and also the properties of the materials that are used in the fabrication process. The first role of the process specification tool is to enable the user to enter the process data through a graphical user interface specialized for the input of process data. The second role of the process specification tool is to store this data in an external location separate from the schematic editor and simulator, where it may still be provided programmatically to the schematic editor and simulator as needed. The process specification tool thus "integrates" the process data with the system-level design and simulation environment: it programmatically retrieves data structures from an external location rather than through interactive user input within the schematic editor. The process data is thus stored separately from the schematic allowing it to be easily used for other schematics and, conversely, any schematic can easily change the entire set of process data that it uses.

Figure 1:
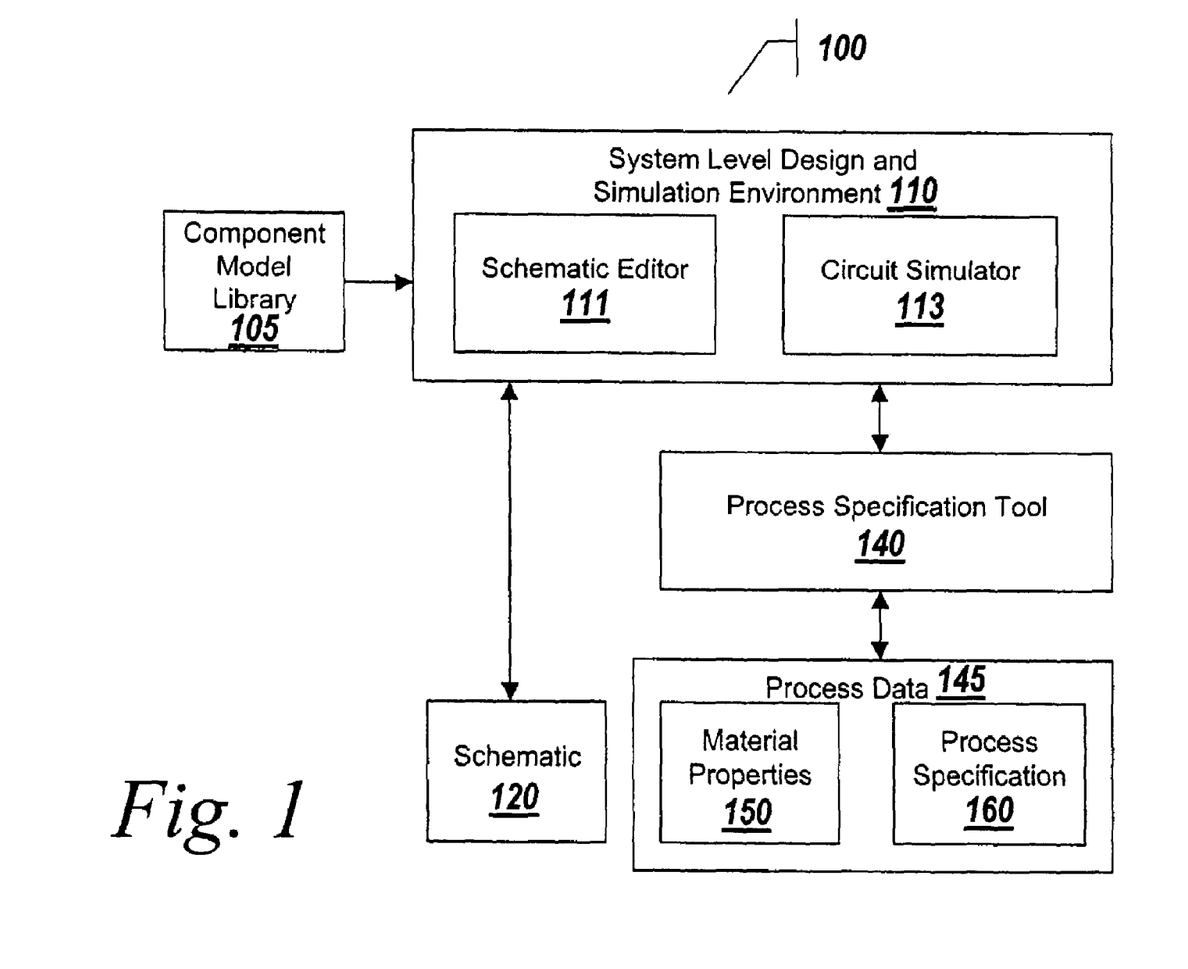
FIG. 1 is a block diagram of an environment suitable for practicing an illustrative embodiment of the present invention.

FIG. 1 depicts an environment suitable for practicing the illustrative embodiment of the present invention. A CAD system 100 includes a system-level design and simulation environment 110, a process specification tool 140, and external location(s) containing a component model library 105, a schematic 120, and process data 145. The system-level design and simulation environment 110 includes a schematic editor 111 and a circuit simulator 113. The process data 145 includes material properties 150, and a process specification 160. The data structures held or referenced by the external locations may take any of a number of different persistent data forms such as simple text files or sophisticated relational databases.

Those skilled in the art will realize that the external locations holding the component library 105, the schematic 120, and the process data 145 may hold more than one instance of each entity without departing from the scope of the present invention. Also, the process data 145 may hold more than one instance of the material properties 150 and the process specification 160. Those skilled in the art will also realize that the system-level design and simulation environment 110 may refer to more than one component model library 105 and more than one schematic 120 without departing from the scope of the present invention. Also, the process specification tool 140 may refer to more than one set of process data 145.

A schematic 120 of a MEMS device is composed in the system-level design and simulation environment 110 using component models from the component model library 105. The parameters of the component models must be configured either directly within the schematic editor 111 or by reference to the process specification 160, which is made available by the process specification tool 140. The behavior of a completed system-level design is simulated in the circuit simulator 113 and the simulation requires process data 145 which is made available by the process specification tool 140.

The process specification tool 140 manages the material properties 150 and the process specification 160 stored in the process data 145. The material properties 150 and the process specification 160 are interactively entered in the process specification tool 140 and stored by the process specification tool as process data 145. The process specification tool 140 also communicates with the system-level design and simulation environment 110 to provide needed process data 145 to the system-level design and simulation environment 110. One of ordinary skill in the art will appreciate that the material properties 150 and the process specification 160 stored in the process data 145 can be managed by separate editing tools, such as a material properties editor for the material properties data 150 and a process specification editor for the process specification 160.

The schematic editor 111 is used to create a schematic 120 of the device based on the information entered by a user. In particular, the schematic editor 111 is used to specify both the components to be used for the design of a MEMS device and the interconnection of the components of the device. The behavior of a component in a MEMS device is specified in the component models provided by the component model library 105. The component models depend on the parameters specified by a user. The schematic editor 111 is used to specify these parameters for the component model. For instance, a device may have many instances of a component, such as many beams, but each can be slightly different in some manner. For example, the dimensions of components may vary, and this difference is described by the individual component parameters. The circuit simulator 113 will use the information contained in the schematic 120, including the component interconnection, the component models, and the individual component parameters to predict the behavior of the device.

It should be understood that although the illustrative embodiment of the present invention is described herein with regard to schematics 120, schematic editors 111 and circuit simulators 113, the present invention may also be applied to signal flow diagram design and simulation. For signal flow diagram design and simulation, a signal flow diagram editor is used to specify model parameters for a signal flow diagram and a signal flow simulator is used to simulate the signal flow behavior of the device being modeled. The discussion of the design and simulation of device schematics contained above and below should be understood to be also applicable to signal flow diagram design and simulation.

Figure 2:
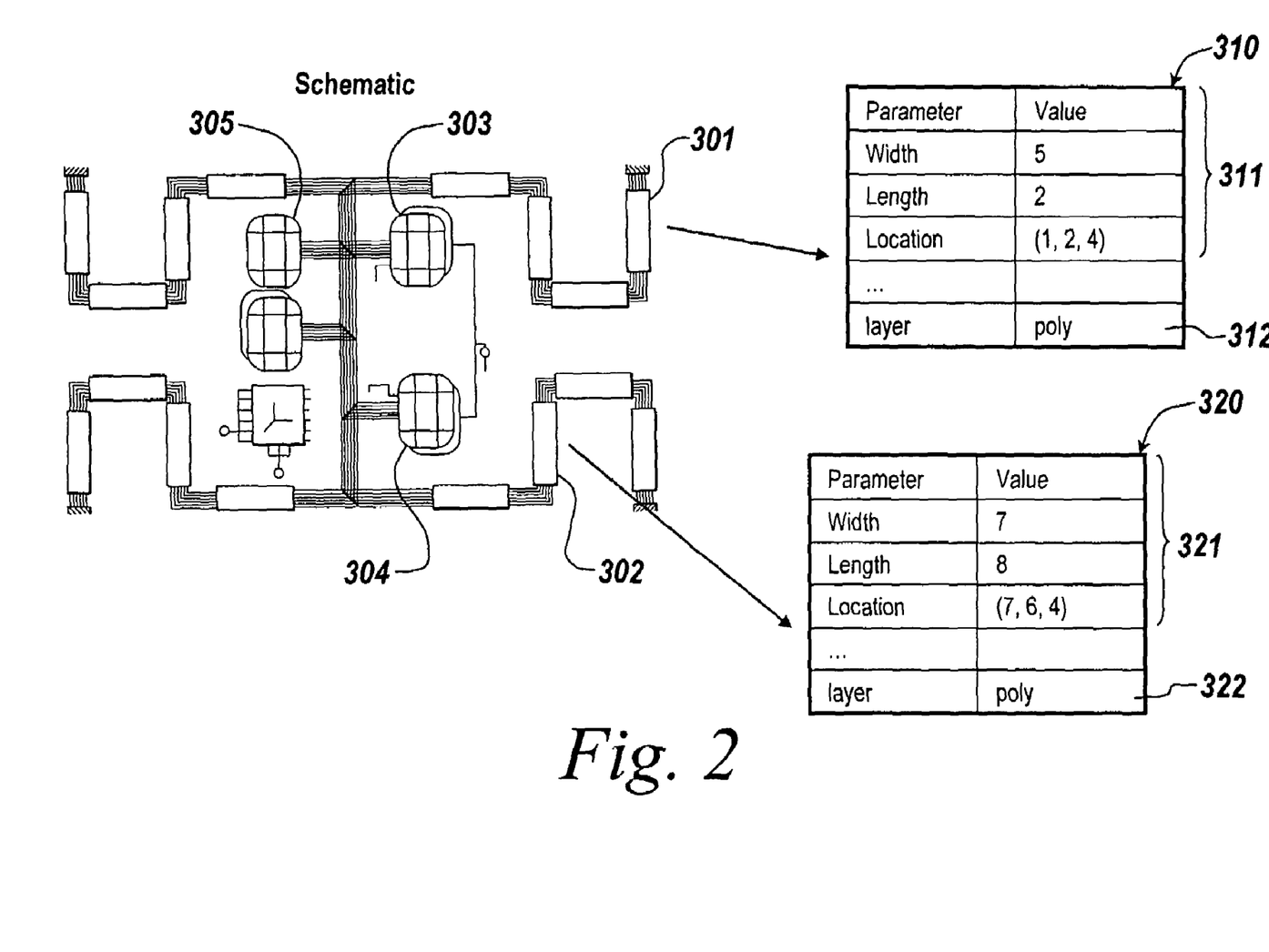
FIG. 2 is a block diagram of a view of a schematic of a MEMS device and associated process data composed in the schematic editor of the design and simulation environment depicted in FIG. 1.

FIG. 2 is a block diagram of a view of a schematic of a MEMS device and the associated process data composed in the schematic editor 111. The schematic shows two beams 301 and 302 specified by component parameters 310 and 320, which include dimensional parameters 311 and 321 and process parameters 312 and 322. The dimensional parameters 311 and 321 include width, length and location parameters. The process parameters 312 and 322 include layer designations. The schematic in FIG. 2 also includes components such as electrodes 303 and 304 and an inflexible plate 305. The schematic editor 111 is used to specify the component parameters 310 and 320.

The illustrative embodiment of the present invention reduces the number of process parameters entered by a user, both globally and also for each component model in a schematic representation of a MEMS device. The reduction occurs as a result of the present invention sharing process parameters both among multiple designs and also among the components within the same design. In the example shown in FIG. 2, the user enters 'poly' (an abbreviation for "polysilicon") for the layer name to designate the material properties 150 and the process specification 160 of the beams 301 and 302 stored in the process data 145. The layer name of the component ('poly') enables the system-level design and simulation environment 110 to request from the process simulation tool 140 the process parameters associated with the 'poly' layer in the process specification 160, and in turn the material properties associated with that layer from the material properties 150. Those skilled in the art will realize that more than one layer name might be needed to specify all of the process parameters needed for a single component.

Electrode models, for example, require at least two separate layer names in order to specify the geometrical properties of the corresponding conductors. The use of multiple layer names in a single component is well within the scope of the present invention.

The circuit simulator 113 receives a representation of the schematic 120 created in the schematic editor 111 and simulates the composite behavior of the entire device. System level simulations can be performed much more quickly and at much lower cost than building and testing actual physical devices.

The layer name of each component links the schematic 120 and the component models 105 with the process data 145 so that the schematic editor 111 and the simulator 113 receive via the process specification tool 140 the process data represented by each layer name. The process specification tool 140 is tightly integrated with the schematic editor 111 and the simulator 113 and provides the schematic editor 111 and the simulator 113 with process data stored in the process data 145. The process data provided to the design/simulation unit 110 is referenced by the layer names specified as parameters of the components. The tight communication automatically provides the necessary information to the schematic editor 111 and the simulator 113 as needed. Additionally, updated data is programmatically provided to the system-level design/simulation unit 110 when the process data 145 changes.

Those skilled in the art will realize that the illustrative embodiment of the present invention may also be implemented so that the process data 145 includes a material properties database 145, but not a process specification. In such an implementation, the components reference the names of materials found in the material properties database 150 rather than the layer names found in the process specification 160. The process specification tool 140 may be used to retrieve the parameter values directly from the material properties database 150.

Figure 3:
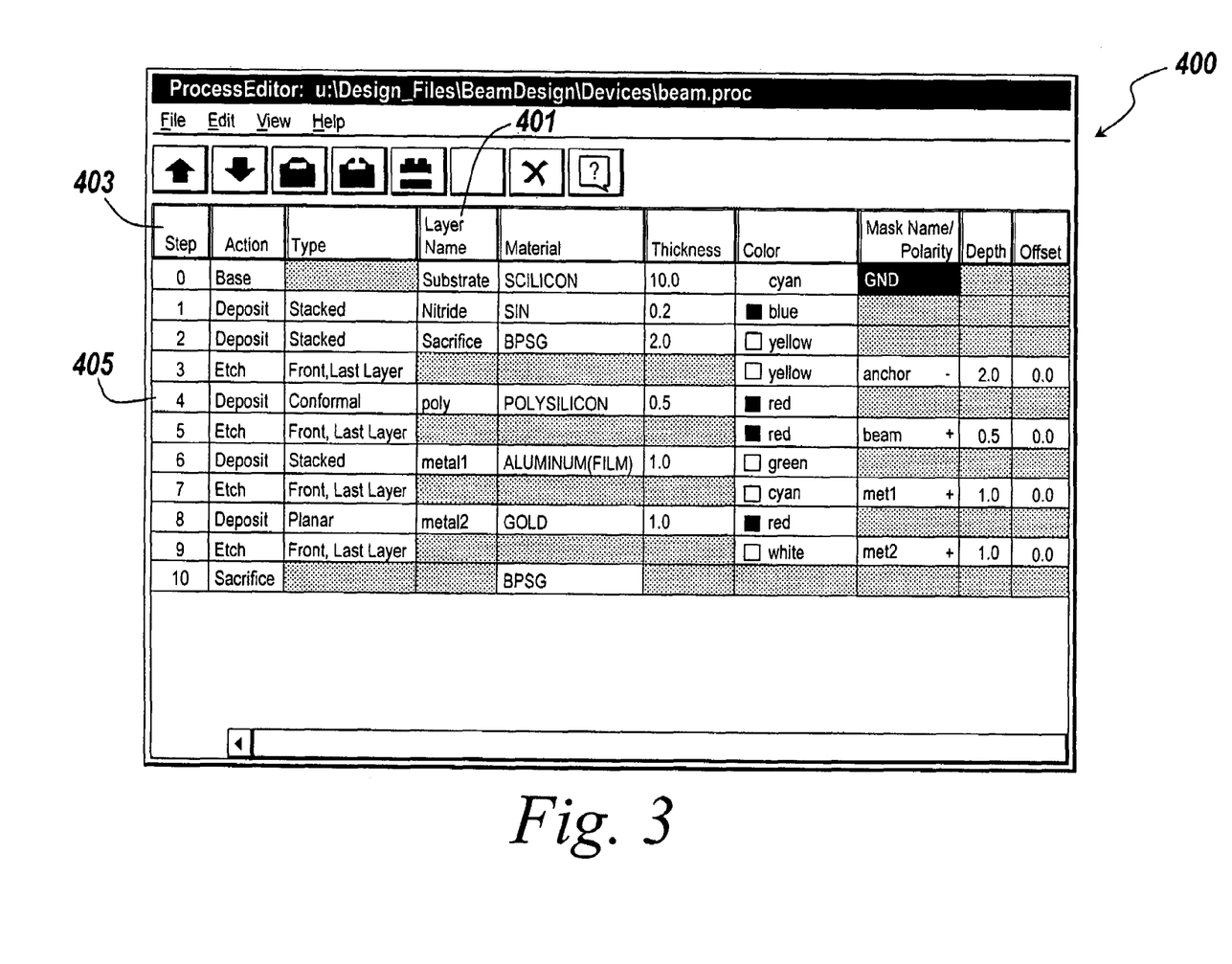
FIG. 3 is a block diagram of a view of a process specification in the illustrative embodiment of the present invention.

FIG. 3 is a block diagram of a view displaying a process specification 160 retrievable by the process specification tool 140 depicted in FIG. 1. The process specification 160 describes each step of the fabrication process of a MEMS device. The steps include depositing layers of material on top of other layers and etching the layers with patterned masks to define the device shape. The masks are two-dimensional patterns that contain the essence of the design. The process specification window 400 includes the description of each fabrication process step 403 numbered from 0 to 10 including the steps of depositing layers and the steps of etching the layers. A layer name 401 is assigned to each layer of the device, such as substrate for a base (step 0), nitride (step 1), sacrifice (step 2), poly (step 4), metal 1 (step 6), metal 2 (step 8). Each layer has parameters including the deposit type, the material name, thickness, etc. Each layer may be referenced by a layer name 401. Those of ordinary skill in the art will appreciate that a layer name 401 is an exemplary method of referencing a layer and that any layer can be referenced by different methods including, for example, by the process step number 403. Each of the etch steps also has parameters, such as the etch type, mask name, mask polarity, etch depth, etch offset, etc. The process specification tool 140 enables the schematic editor 111 and the circuit simulator 113 to access the process data 145. If 'poly' is entered as the layer name of the beams 301 and 302 in the schematic editor 111, as shown in FIG. 2, the process specification tool 140 supplies the process parameters associated with the deposit step 405 in which the layer name 'poly' is displayed in the window 400.

Figure 4:
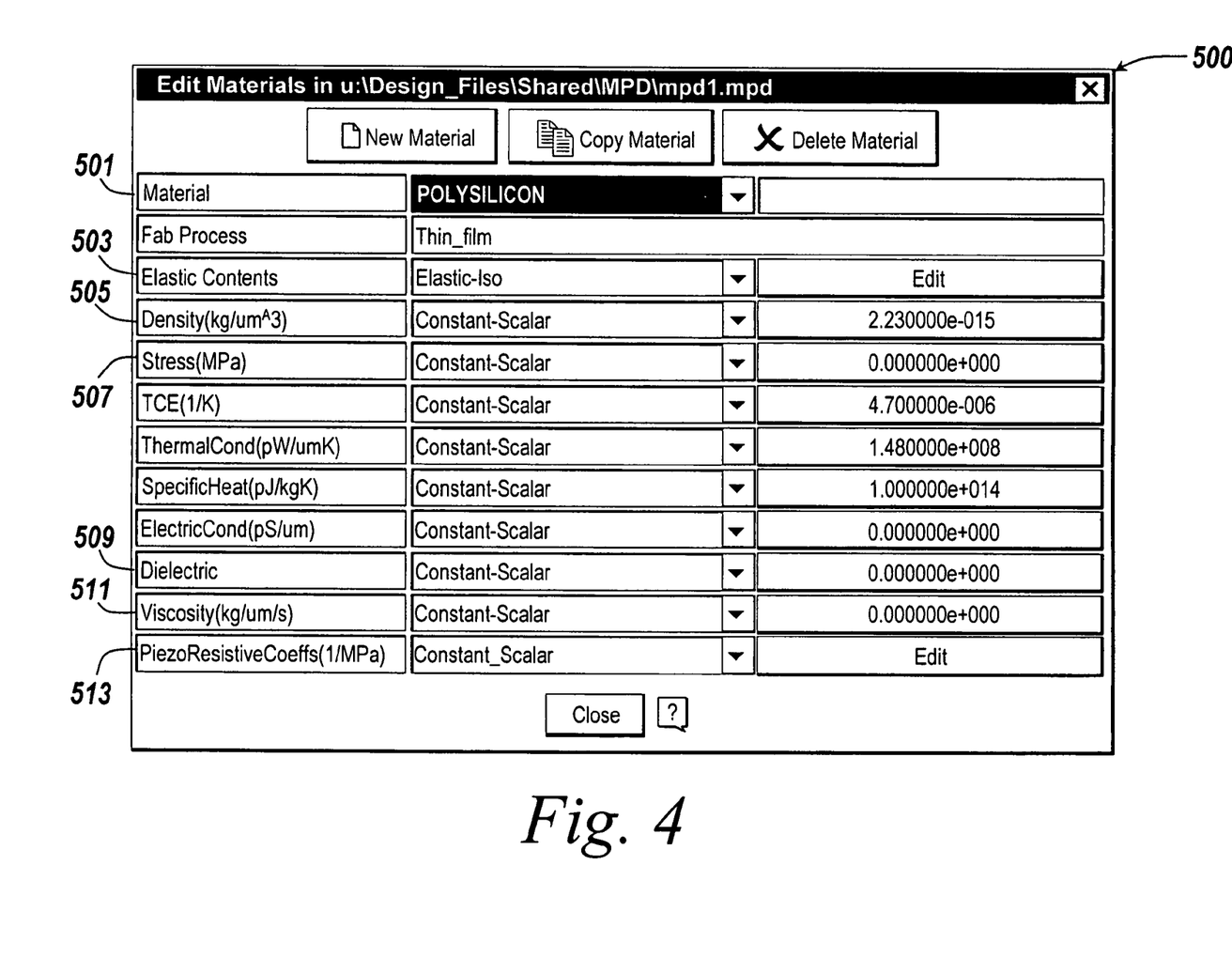
FIG. 4 is a block diagram of a view of material properties process data in the illustrative embodiment of the present invention depicted in FIG. 1.

FIG. 4 is block diagram of a view of the material properties process data 150 depicted in FIG. 1. The process specification tool 140 provides a window 500 for entering the material properties. The window 500 shows the material property names of a selected material on the left side of the window 500. An exemplary material name 'POLYSILICON' 501 includes material properties such as elastic constants 503, density 505, stress 507, dielectric constant 509, viscosity 511, piezo-resistive coefficient 513, etc. The material name 'POLYSILICON' is the material specified for the 'poly' layer shown in FIG. 3.

Figure 5:
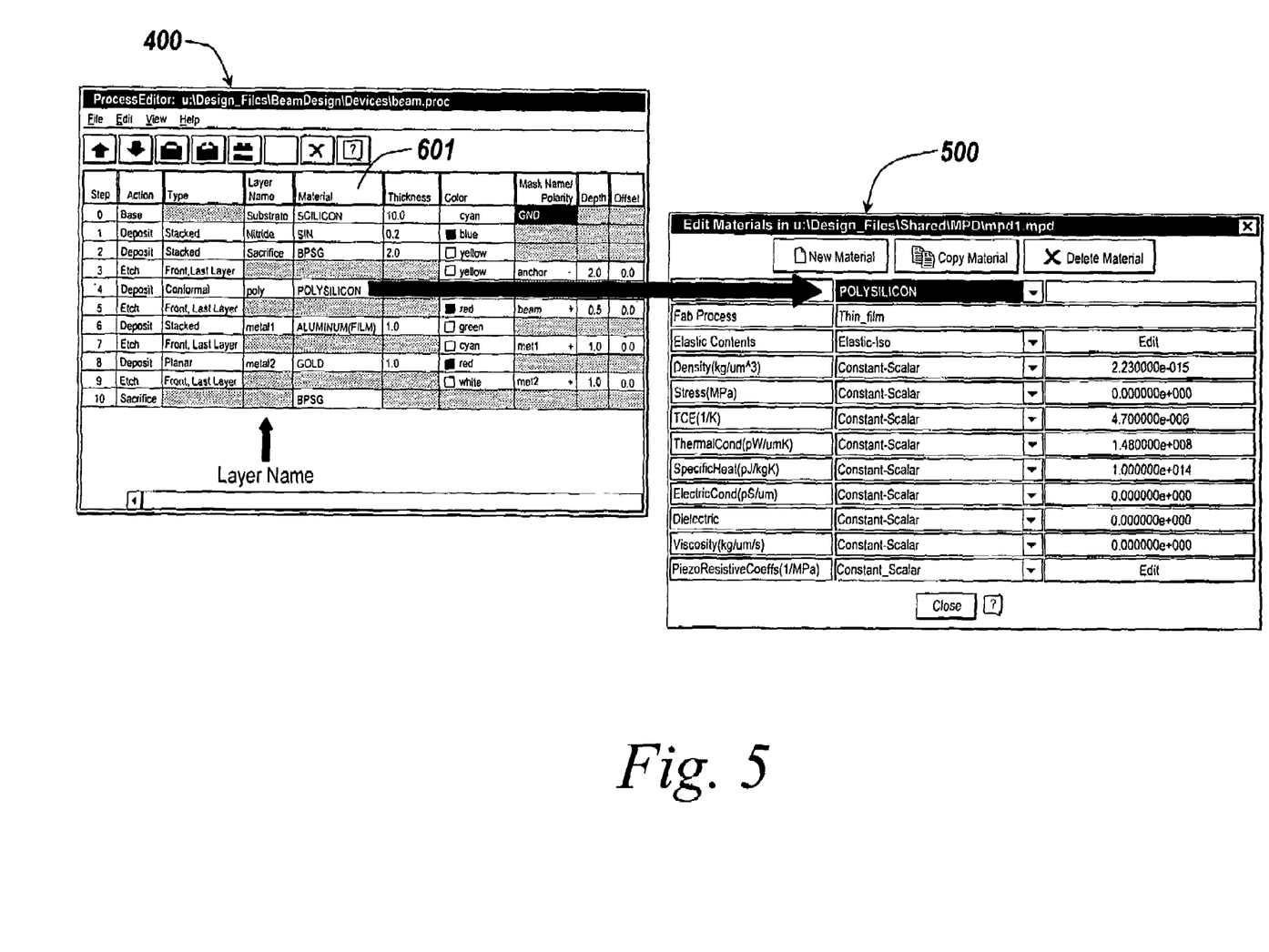
FIG. 5 is a block diagram depicting the linkage between the process specification data displayed in FIG. 3 and the material properties data displayed in FIG. 4.

FIG. 5 shows the link between the process specification and the material properties depicted in FIGS. 3 and 4, respectively. The process specification shown in the window 400 has the material name 601 in each layer, such as SILICON, SIN, BPSG, POLYSILICON, ALUMINUM and GOLD. This material name 601 refers to the material properties of a material that may be displayed in the window 500. For instance, the 'poly' layer has the material name of 'POLYSILICON' which refers to the material properties of the material POLYSILICON displayed in the window 500. Those of ordinary skill in the art will appreciate that the material properties could be displayed in the window 400 that displays the process specification.

Figure 6:
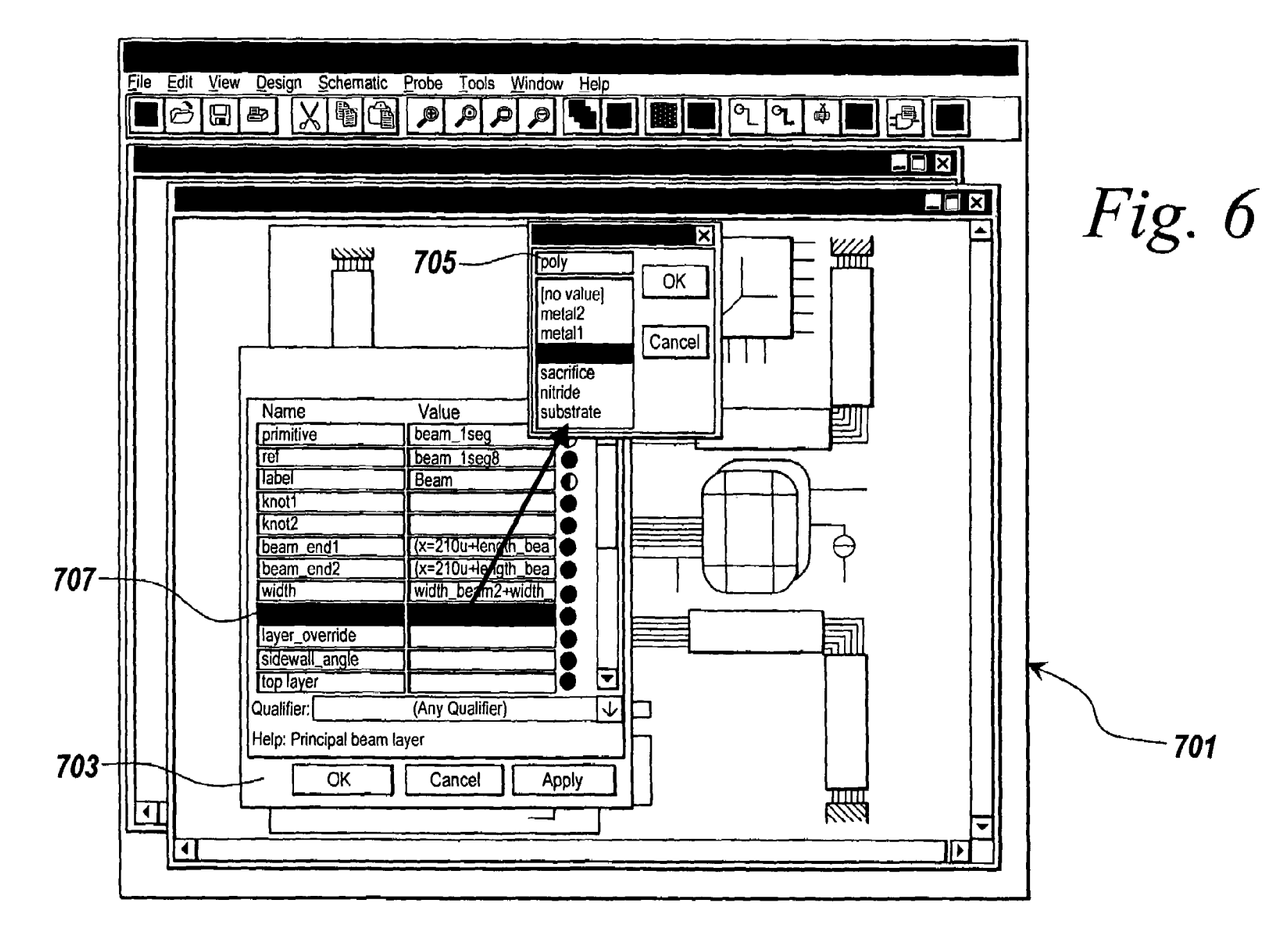
FIG. 6 is a block diagram depicting a window view set in the design and simulation environment of FIG. 1 displaying a schematic of a device with a superimposed pop-up window for entering the parameters of a component model, the parameters including the layer name.

FIG. 6 is a block diagram depicting a window view 701 set in the system level design and simulation environment 110 of FIG. 1. Within the schematic editor 111, the user enters parameters for each component model including parameters that refer to the process data 145. If a component of the device, such as a beam, is selected in the schematic, the schematic editor 111 provides a beam component properties window 703 for entering the parameters of the selected beam. The component parameters of the beam include a 'layer' parameter 707 for designating the layer on which the beam is to be fabricated. The layer name of the component refers to the process parameters of the layer stored in the process data 145.

If a user clicks on the 'layer' parameter, a new window 705 opens with a list of the layer names that are defined in the process specification 160. The list of layer names is supplied to the schematic editor 111 by the process specification tool 140. For example, the window displays the layer names metal 2, metal 1, poly, sacrifice, nitride and substrate that correspond to the layer names shown in the window 400 in FIG. 3. If the layer name 'poly' is selected for the beam, the schematic editor 111 and the simulator 113 obtain the process parameters of the 'poly' layer shown in the window 400 in FIG. 3.

The ability to place a component on a layer simply by selecting a layer name in the window 705 provides a great deal of flexibility. For instance, if the user chooses a different layer 707 in FIG. 6, such as 'nitride', the schematic editor 111 and simulator 113 will switch all of the process parameters in the beam component properties window 703 to be those of the 'nitride' layer instead of the 'poly' layer. Conversely, if the user adds a layer named 'oxide' via the process specification window 400, then window 705 will automatically include 'oxide' in its list. Also, if the user opens the window 500 in FIG. 5 and changes the density 505, the schematic editor 111 and the circuit simulator 113 are immediately notified about this change, and use the modified value of the density 505 for all components that specify layers which have their material name set to 'POLYSILICON'.

Those skilled in the art will recognize that while the term process data has been used herein to refer to information on the fabrication steps as illustrated in window 400 in addition to the material properties data 150 of each step illustrated in window 500, other types of data categorization are within the scope of the present invention. For example, the term process data could refer to any categorization of the data related to the manufacturing of a micro-fabricated device such as material names, fabrication step number etc.

Figure 7:
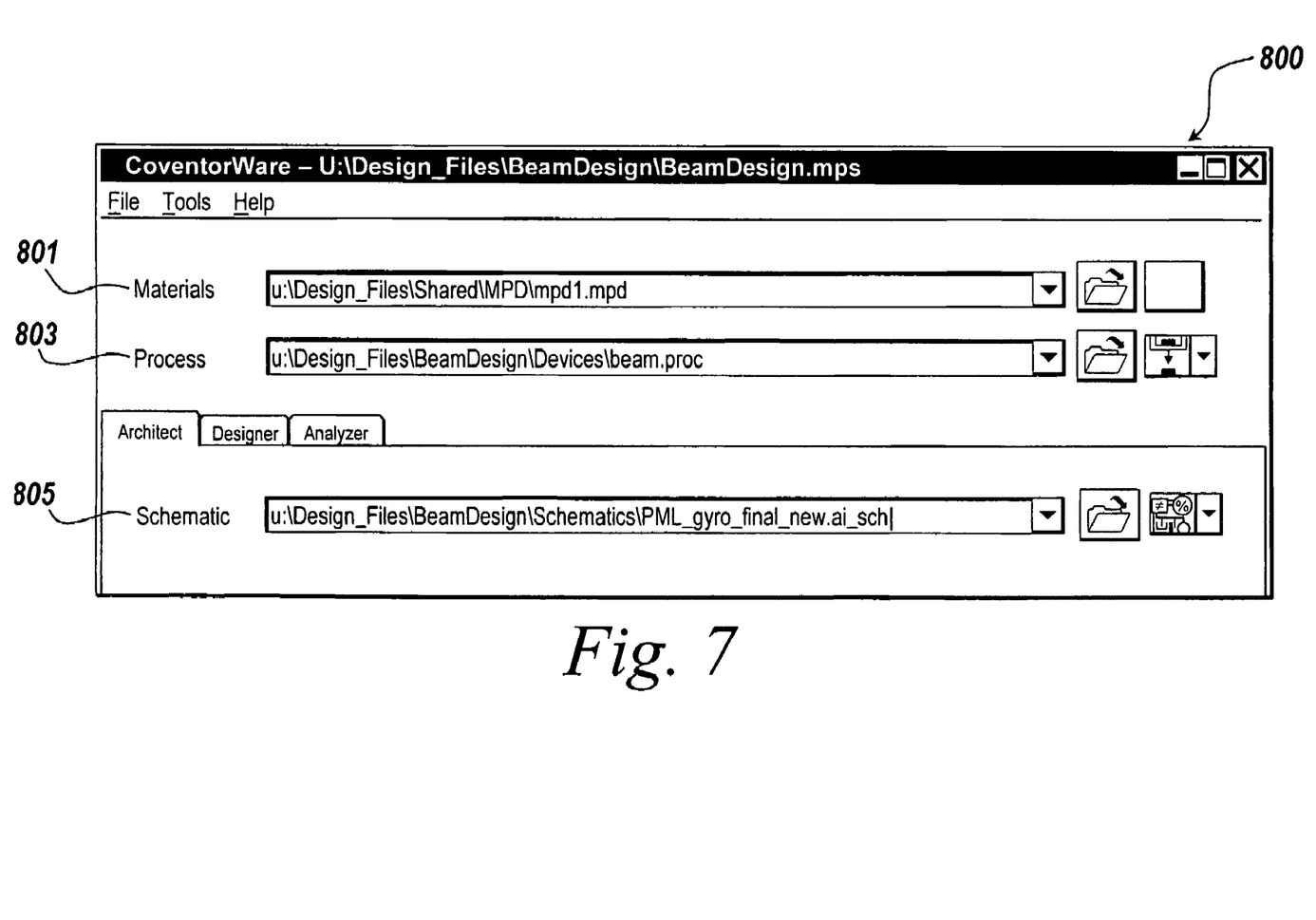
FIG. 7 is a block diagram depicting a window view for designating the external files that contain the schematic, process specification and material properties of a device to enable the process specification tool to integrate the process specification and material properties with the system-level design and simulation environment depicted in FIG. 1.

FIG. 7 is a block diagram depicting a window view for designating the external files that contain the schematic 120, process specification 160 and material properties 150 of a device to enable the process specification tool 140 to integrate the process specification and material properties with the system-level design and simulation environment 110 depicted in FIG. 1. The process specification tool 140 provides a window 800 for entering the names of a material properties database 801, a process specification 803 and a schematic 805 of a device. These entries enable the process specification tool 140 to integrate the material data 150 and the process data 160 with the schematic 120 of the device. The integration provided by the process specification tool 140 enables the schematic editor 111 and simulator 113 to access all of the process data 145 including the material properties 150 and the process specification 160. The integration also ensures that any changes to the process data 145 are automatically communicated to the schematic editor 111 and the circuit simulator 113. Window 800 may be used to globally change all of the process data for a given schematic at once. If the name of the process specification reference 803 or the name of the material properties reference 801 is changed to refer to a different source, then the schematic 805 will be associated with a completely different set of process parameters. This avoids the time-consuming and error-prone task of modifying all of the process parameters within the schematic editor 111. Similarly, window 800 may be used to share process information among multiple schematic designs. By selecting a different schematic name 805, but keeping the same process specification 803 and material properties 801, the newly selected schematic 805 is automatically associated with all of the process data used for the previously selected schematic.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in the physical design and simulation of MEMS devices. Similarly, while the illustrative embodiment of the present invention has been described with reference to MEMS devices, the present invention is equally applicable to the design of any micro-fabricated device and may be used to model non-MEMS devices in network, circuit and signal flow simulators used to model and simulate electrical and non-electrical systems. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method for use with an electronic device holding a system-level design and simulation environment for designing a device to be fabricated through a manufacturing process, said system-level design and simulation environment interfaced with at least one system-level schematic that includes multiple components and a location holding process data external to said environment, each said component including a component model, said component model being a mathematical description of component behavior, said method comprising
providing a process specification tool for retrieving the process data and communicating said process data to said system-level design and simulation environment;
integrating said process specification tool with the system level design and simulation environment to programmatically alter the components of said system-level schematic based on changes in said process data, said process data including a process specification and a collection of material properties data;
providing with said process specification tool a user interface for a user to enable the user to specify a name of said system-level schematic, a name of a collection of material properties data, and a name of a process specification, said names referencing a storage location holding data for the system-level schematic, a storage location holding the materials properties data and a storage location holding the process specification data respectively; and
receiving a user-selection of the name of the system-level schematic, a collection of material properties data and the name of a process specification via said user interface.

2. The method of claim 1 wherein said process data includes a process specification, said process specification listing the steps of a manufacturing process for said device to be fabricated.

3. The method of claim 1 wherein said process data includes material properties for said manufacturing process.

4. The method of claim 1, further comprising:
retrieving said process data with said process specification tool;
providing the retrieved process data to said system-level design and simulation environment; and
using said process data and said system-level schematic in a simulation.

5. The method of claim 4, further comprising:
altering said process data, said alteration being reflected in the components of said system-level schematic as a result of the integration of said process specification tool; and
re-running said simulation using said altered data.

6. The method of claim 5 wherein the process data being altered is a process specification.

7. The method of claim 5 wherein the process data being altered is a collection of material properties data.

8. The method of claim 1 wherein said system-level design and simulation environment includes a schematic editor.

9. The method of claim 1, further comprising:
running a first simulation based upon the user selections received via said user interface;
receiving an altered selection of at least one of a name of said collection of materials properties data and name of a process specification via said user interface;
associating said system-level schematic components with data referred to by said altered selection; and
running a second simulation based upon the at least one altered user selection received via said user interface.

10. The method of claim 1, further comprising:
receiving an altered selection of the name of said system-level schematic, the altered name of the system-level schematic thereby becoming programmatically associated with the material properties data and the process specification data selected by the user.

11. The method of claim 1 wherein said process data programmatically supplies parameters to said component models.

12. The method of claim 1 wherein said system-level design and simulation environment is used to design and simulate a MEMS (Micro-Electrical Mechanical System) device.

13. The method of claim 1 wherein said system-level design and simulation environment is used to design and simulate a micro-fabricated device.

14. A storage medium for use with an electronic device, the storage medium holding computer-executable instructions for a system-level design and simulation environment for designing a device to be fabricated through a manufacturing process, said system-level design and simulation environment interfaced with at least one system-level schematic that includes multiple components and a location holding process data external to said environment, the instructions comprising:

instructions for providing a process specification tool for retrieving the process data and communicating said process data to said system-level design and simulation environment;

instructions for integrating said process specification tool with the system level design and simulation environment, said integration programmatically altering the components of said system-level schematic based on changes in said process data, said process data including a process specification and a collection of material properties data;

instructions for providing with said process specification tool a user interface for a user to enable the user to specify a name of said system-level schematic, a name of a collection of material properties data, and a name of a process specification, said names referencing a storage location holding data for the system-level schematic, a storage location for the materials properties data and a storage location for the process specification data respectively; and instructions for receiving a user-selection of the name of the system-level schematic, a collection of material properties data and the name of a process specification via said user interface.

15. The medium of claim 14 wherein said process data includes a process specification, said process specification listing the steps of a manufacturing process for said device to be fabricated.

16. The medium of claim 14 wherein said process data includes material properties for said manufacturing process.

17. The medium of claim 14 wherein the instructions further comprise:

instructions for retrieving said process data with said process specification tool;

instructions for providing the retrieved process data to said system-level design and simulation environment; and instructions for using said process data and said system-level schematic in a simulation.

18. The medium of claim 17 wherein the instructions further comprise:

instructions for altering said process data, said alteration being reflected in said system-level schematic as a result of the integration of said process specification tool; and instructions for re-running said simulation using said altered data.

19. The medium of claim 18 wherein the process data being altered is the process specification.

20. The medium of claim 18 wherein the process data being altered is the collection of material properties data.

21. The medium of claim 14 wherein the instructions further comprise:

instructions for running a first simulation based upon the data referenced by the user selections received via said user interface;

instructions for receiving an altered selection of at least one of the name of said collection of materials properties data and the name of said process specification via said user interface;

instructions for associating said system-level schematic components with data referred to by said altered selection; and instructions for running a second simulation based upon the at least one altered user selection received via said user interface.

22. The medium of claim 14 wherein the instructions further comprise:

instructions for receiving an altered selection of the name of said system-level schematic, the altered name of the system-level schematic thereby becoming programmatically associated with the material properties data and the process specification data selected by the user.

23. The medium of claim 14 wherein said process data programmatically supplies parameters to said component models.

24. The medium of claim 14 wherein said system-level design and simulation environment is used to design and simulate a MEMS (Micro-Electrical Mechanical System) device.

25. The medium of claim 14 wherein said system-level design and simulation environment is used to design and simulate a micro-fabricated device.

* * * * *